US006171387B1

(12) United States Patent
Charnock et al.

(10) Patent No.: US 6,171,387 B1
(45) Date of Patent: Jan. 9, 2001

(54) REVERSIBLE AGGLOMERATION OF FINE PARTICLE PLASTER OF PARIS

(75) Inventors: Ronald Scott Charnock, Blunham; Derrick Frederick Deamer, Stevenage; Anthony John Harris, Hatfield, all of (GB)

(73) Assignee: Imperial Chemical Industries PLC, London (GB)

( * ) Notice: Under 35 U.S.C. 154(b), the term of this patent shall be extended for 0 days.

(21) Appl. No.: 09/346,944

(22) Filed: Jul. 2, 1999

(30) Foreign Application Priority Data

Jul. 3, 1998 (GB) .................................................. 9814508

(51) Int. Cl.⁷ .............................. C04B 11/00; C09C 1/02
(52) U.S. Cl. .................... 106/772; 106/778; 106/783; 106/784; 106/785; 106/461; 423/555
(58) Field of Search .................................... 106/772, 778, 106/783, 784, 785, 461; 423/555

(56) References Cited

U.S. PATENT DOCUMENTS

| | | | |
|---|---|---|---|
| 2,221,175 | 11/1940 | Bechtold | 106/27 |
| 2,779,682 | 1/1957 | Langer | 106/109 |
| 4,173,610 | 11/1979 | Huller et al. | 264/28 |
| 5,253,991 | 10/1993 | Yokota et al. | 425/6 |
| 5,707,443 | 1/1998 | Brown et al. | 106/713 |

FOREIGN PATENT DOCUMENTS

| | | | |
|---|---|---|---|
| 0 159 807 | 10/1985 | (EP) | B01D/53/34 |
| 2 403 308 | 4/1979 | (FR) | C04B/7/00 |
| 1112398 | 5/1968 | (GB) | A23I/1/00 |
| 2 004 861 | 4/1979 | (GB) | C04B/7/36 |

OTHER PUBLICATIONS

Zanchetta brochure, Roto Technology (undated).

*Primary Examiner*—Anthony Green
(74) *Attorney, Agent, or Firm*—Pillsbury Madison & Sutro LLP

(57) ABSTRACT

A method for the reversible agglomeration of fine particles of plaster of Paris ($CaSO_4 \cdot \frac{1}{2}H_2O$) and agglomerates made by the method which comprises agitating the fine particles in the presence of an organic polar liquid preferably nearly dry and having some ability to form hydrogen bonds (especially n-propanol) and then drying off most of the liquid whereby the fine particles spontaneously interlink (possibly by mechanical keying) in a way which allows the interlinks to be disrupted so as to release fine particles when the agglomerates are stirred into water by hand. Also a dry precursor mixture comprising the agglomerates containing conventional auxiliary additives for use in mixing with water to make aqueous compositions for use as filler pastes, casting materials or plaster slurries.

23 Claims, No Drawings

REVERSIBLE AGGLOMERATION OF FINE PARTICLE PLASTER OF PARIS

This invention relates to a method for the reversible agglomeration of fine particle plaster of Paris, to the reversible agglomerates made by the method, to precursor mixtures for making aqueous compositions containing the reversible agglomerates plus water and to the compositions themselves. Plaster of Paris is the common name for calcium sulphate hemihydrate or $CaSO_4 \cdot \tfrac{1}{2}H_2O$, also known as casting plaster.

Water hardens plaster of Paris by hydrating it from the hemihydrate to the dihydrate which is gypsum or $CaSO_4 \cdot 2H_2O$. The hydration is accompanied by a small expansion which enables plaster of Paris to find use in aqueous moulding and filler compositions, sometimes called "hydraulic setting pastes". More specifically, moulding compositions may be pastes or slurries of plaster and water, whilst filler compositions are usually pastes. Slurries may also be used to impregnate cloth so that when the plaster hardens, a rigid structure is created as is the case when plaster of Paris is used to make splints for broken bones.

Such uses of plaster of Paris require the efficient dispersion of particles of plaster in water in a way which ensures that the particles are thoroughly wetted. The dispersion is often performed by hand and (at least in the case of fillers) by unskilled users such as DIY (do-it-yourself) householders. Efficient dispersion in such circumstances demands the use of fine particles, preferably having a weight average particle dimension of below 100 $\mu$m, where 1 $\mu$m equals $1 \times 10^{-6}$ m. Unfortunately, the delivery of particles of this fineness from a packet to the water into which they are to be dispersed can create various problems especially for unskilled users. Firstly, fine particles of plaster of Paris have a poor ability to flow and so they (and dry compositions containing them) do not pour easily from a packet. This often leads the user to tap the packet or to use a spoon. In addition to creating a dust, tapping the packet also often causes a sudden delivery of a large volume of plaster into the water and of course spooning will also deliver a large volume in a single amount. Such large volumes of plaster will have a relatively low ratio of easily accessible surface area to volume of plaster which means that the wetting of the plaster will be very inefficient. As a result, the plaster will clump into large irregularly sized pellets containing unwet particles.

Large irregular sized pellets formed by clumping need to be broken down during the subsequent dispersion of the plaster into the water for if they survive into the final paste or slurry, they will be a source of defects in the surface of the hardened plaster. For example, they will form blemishes in a plaster caste or in the surface formed by a hardened filler composition which has been applied by a filling knife or trowel into a hole or crack in a wall or ceiling. The breaking down of the pellets demands the exertion of significant shear which is difficult and tiring to apply when dispersing by hand. Many DIY users do not have the sustained strength or patience to achieve a sufficient break down and so they become dissatisfied with the surfaces they achieve.

Clearly it would be desirable to improve the flow of fine particulate plaster of Paris without inhibiting the ability of its particles to be wetted by water. Unfortunately, the use of binder additives to coarsen the plaster usually increases the time needed to disperse the plaster in water and may inhibit the ability of the plaster to harden.

This invention provides a method for the reversible agglomeration of fine particle plaster of Paris (which preferably comprises particles having a weight average particle dimension of less than 300 $\mu$m and especially less than 100 $\mu$m) which method includes a) providing a vessel which in turn is provided with means capable of agitating fine particles of plaster of Paris,
b) introducing into the vessel both fine particles of plaster of Paris and an organic polar liquid,
c) subjecting the particles and the liquid to agitation and
d) subsequent to a period of agitation, subjecting the plaster of Paris to drying to remove at least a major proportion (preferably at least 95 wt %) of the organic polar liquid whereby pluralities of particles spontaneously interlink to form agglomerates having a weight average dimension in excess of 100 $\mu$m and preferably in excess of 300 $\mu$m and in which interlinks are disruptable when the agglomerates are dispersed by hand into water. Disruption of the agglomerates reverses the agglomeration process and so releases fine particles into the water. It can easily be accomplished by stirring the agglomerates by hand into water using a spoon, knife, trowel or other stirrer whereupon the particulate plaster of Paris becomes efficiently wetted. Agglomerates of as much as 10 mm maximum dimension have been achieved, but a maximum dimension range of 0.2 to 2 mm (especially 0.3 to 1 mm) is preferred. The dimensions of the agglomerates can be adjusted by adjusting the amount of agitation to which the particles of plaster of Paris are subjected.

The purpose of agitating the particles and polar liquid is to ensure that the two are efficiently mixed together (either alone or with any optional auxiliary additives) so that the liquid can thoroughly wet the surfaces of the particles of plaster and any other additives present. Any agitating means which can achieve this will be suitable. A convenient means comprises a rotary blade impeller-type mixer in which the blades are located near the base of a cylindrical vessel which houses them. A particularly suitable mixer is supplied by Zanchatta & C s.r.l of San Salvatore, Lucca, Italy and described by them in their brochure "Roto Technology", the contents of which are herein incorporated by reference. The mixer comprises three co-planar equally spaced radial blades which make a running fit in a vessel. The blades are about 14 cm long and are rotated at a speed of from 100 to 800 rpm or more preferably from 400 to 600 rpm.

It is convenient to use a fine particle plaster of Paris in which 30 to 60 wt % of the particles of plaster have a weight average particle dimension of less than 50 $\mu$m and preferably 30 to 50 $\mu$m. Such plaster is sold as "fine casting plaster".

It is very much preferred that the organic polar liquid should have at least some ability to form hydrogen bonds even though it is by no means certain that hydrogen bond formation plays any part in the successful performance of this invention. Preferred liquids are hydroxy compounds and in particular the straight chain aliphatic monohydric alcohols containing up to 4 carbon atoms. Methanol tends to form agglomerates which are to some extent more difficult to disrupt by stirring in water whereas butanol and isopropanol form agglomerates which are less robust being only moderately resistant to disruption by dry shearing forces of the type met during the filling or transport of packets of plaster. Ethanol and n-propanol both produce robust agglomerates which nevertheless disrupt easily on stirring in water with n-propanol producing the best balance between robustness and disruptability in water.

It is preferred to use the organic polar liquid in an amount which is between the minimum needed to wet completely the surfaces of the particles and the amount which causes the particles to have the flow characteristics of a slurry. For this reason, it is preferred to use from 7 to 14 wt % of the liquid where the percentage is based on the combined weights of the particles and the liquid. It is particularly preferred to use from 10 to 14 wt % of n-propanol or ethanol.

The use of over-wet alcohols can sometimes cause premature hydration of the plaster which in turn can hinder or prevent the disruption of the agglomerates leading to poorer wetting or in extreme cases to the formation of fully hardened particles of gypsum. Small amounts of water can be tolerated particularly in n-propanol, but it is preferred to have less than 0.3 wt % present. Organic liquids containing such low levels of water will be referred to as "nearly dry". The ability to tolerate some water has the advantage of enabling cheaper industrial grades of polar liquids to be used.

The amount of agitation to which the particles and liquid should be subjected is a function of type of machinery chosen and the size of agglomerates which are wanted. However using the Zanchetta machine described above at 500 rpm, it is preferred to agitate for 30 to 50 minutes prior to starting drying in order to obtain agglomerates of from 300 $\mu$m to 1 mm maximum dimension.

The contents of the vessel are subjected to drying in order to remove as much as is conveniently possible of the organic polar liquid. Preferably the residual amount of organic polar liquid should be less than 0.5 wt % and preferably below 0.2 wt % especially where other additives are present when usually less than 0.05 wt % is desirable. Excessive residual amounts of organic polar liquid are both an expensive waste and an impediment to disruption of the agglomerates on stirring in water. Drying may be conveniently performed at 40 to 70° C. (preferably 45 to 60° C.) under a vacuum which may preferably reach down to below 60 m.bar and most preferably down to 30 m.bar. In order to assist reasonably quick drying without premature loss of liquid, it is preferred that the organic liquid should have a boiling point of from 50 to 120° C.

This invention also provides an agglomerate of a plurality of reversibly interlinked fine particles of plaster of Paris wherein a) the fine particles have a weight average particle dimension of below 300 $\mu$m (and preferably below 100 $\mu$m but preferably above 20 $\mu$m and especially in the range 30 to 50 $\mu$m), b) the agglomerate has a maximum dimension of above the weight average particle dimension of the fine particles and preferably above 100 $\mu$m (and preferably above 300 $\mu$m but preferably below 5 mm) and c) interlinks within the agglomerate can be disrupted by hand-stirring a group of the agglomerates into water.

The true nature of the reversible interlinks between the fine particles within an agglomerate is still unclear. As mentioned earlier, organic polar liquids having a hydrogen bonding ability appear to produce the most useful agglomerates yet examination of the dry agglomerates has so far failed to reveal evidence of hydrogen bonding. High magnification photo-micrographs of the agglomerates suggest that the particles may interlink by keying together mechanically so as to produce a reversibly interlocking structure which can be disrupted and destroyed by the ingress of water into the agglomerate when subjected to hand stirring, for example by means of a spoon, knife or trowel. Preferably the size of the group of agglomerates which is to be stirred should be at least a spoonful which suggests a group of at least 200 agglomerates.

The agglomerates flow well and can be poured steadily from a packet into water. When their structure is disrupted on stirring in water, they release fine particles of plaster which are easily converted to a homogenous aqueous paste or slurry at ambient temperatures. Stirring need not be vigorous and may be competently performed by unskilled DIY users employing a spoon, trowel, knife or similar stirrer.

Agglomerates made according to this invention are usually passed through a sieve to separate out and remove those having maximum dimensions of less than 300 $\mu$m. The removed particles are often called "fines". It has been found that the addition of "fines" to the fine particles of plaster used in the agglomeration method accelerates the formation of new agglomerates.

This invention further provides a dry precursor mixture for use in making an aqueous composition (for example a hydraulic filler paste) containing water and agglomerates of plaster of Paris as described above wherein the agglomerates also contain at least one of the following auxiliary additives:

a) a thickener/binder, preferably up to 3 wt %, b) a retarder, preferably up to 1 wt %, c) a humectant, preferably up to 1 wt %, d) an effervescer, preferably up to 1 wt %, e) an adhesion promoter, preferably up to 1 wt %, f) an extender, preferably up to 25 wt % and g) a buffer component, preferably up to 1 wt %.

The weight percentages quoted in (a) to (g) above are based on the total weight of the dry precursor mixture. The auxiliary ingredients are preferably dry blended with the fine particle plaster before the introduction of the organic polar liquid and as a result they are usually found located in the agglomerates.

Thickeners are used to increase the viscosity of an aqueous composition to make it easier to apply by unskilled users. Binders serve a similar function. Thickeners or binders are usually compounds which interact with water molecules to form micellar structures. Examples include celluloses such as hydroxypropylmethyl cellulose or methylhydroxyethyl cellulose or "so-called" water-soluble natural or oxidised starches.

Retarders serve to extend the hydration time of plaster of Paris from around 5 to 15 minutes (depending on the source of the plaster) to about an hour which allows extra time for unskilled users to apply the compositions. Typical retarders are tannic acid, tartaric acid and combinations of sodium tripolyphosphate and citric acid which make sodium citrate in situ.

Humectants are additives which help to retain water which is helpful to the application of the compositions by unskilled users to permeable surfaces which draw water from the composition and make it less workable. Typical humectants are hydroxypropyl guar gum and also the celluloses mentioned above.

Effervescers assist in disrupting the interlinks and so shorten the time needed for stirring. They usually comprise a combination of a metal carbonate or bicarbonate and an organic acid. Examples include sodium or calcium carbonates or sodium bicarbonate used with citric or tartaric acids.

Adhesion promoters assist the ability of the hardened composition to stick to surfaces which are not completely sound often due to unskilled preparation. The most frequently used promoter is polyvinyl alcohol with polyvinyl acetate finding occasional use.

Extenders are sometimes used to help to disperse the particles of plaster into water. They include calcite, talc, chalk and clays, particularly attapulgite clay.

Buffer components such as gypsum ($CaSO_4.2H_2O$) are used in combination with a retarder to offset the unpredictable consequences of unskilled users employing incompetently cleaned application tools such as filling knives or trowels with residues of hardened plaster remaining on them from previous jobs.

Lastly, this invention provides a method for making an aqueous composition containing plaster of Paris and water wherein agglomerates as made or described above or a dry precursor mixture containing them and auxiliary additives are stirred into water by hand using a stirrer.

The invention will now be illustrated by the following Examples of which Examples A and B are comparative.

EXAMPLE 1

Reversible Agglomeration of a Simple Fine Particle Plaster of Paris a) Agitation Means The agglomeration was performed using agitation imparted by a Zanchetta "Roto P One Bowl" mixer/dryer supplied by Zanchetta & C s.r.l. The mixer/dryer comprised a cylindrical mixing vessel (or "bowl") which housed three coplanar equally spaced axially mounted radial blades which made a running fit within the cylindrical walls of the vessel. The blades were each about 14 cm from tip to axis and were located at a running clearance just above the floor of the vessel. They were capable of being rotated at speeds of from 100 to 1000 rpm.

The vessel was also provided with a water jacket for warming its contents so as to assist drying and it was also coupled to a vacuum extractor for removing vaporised liquid.

b) Method of Agglomeration

The fine particle plaster of Paris chosen for this example was a white "fine casting plaster" sold by British Gypsum of Newark, England which had a weight average particle dimension of from 30 to 50 µm and which contained no additives. 100 parts by weight (ppw) of this plaster were charged to the mixer/dryer at ambient temperature and the blades were rotated at 500 rpm to agitate the particles. About 30 seconds after the start of rotation, 20 ppw of analytical grade of "nearly dry" n-propanol (containing 0.03 wt % water) were poured into the vessel whilst rotation was maintained and continued for a further 3 minutes and then stopped. Material clinging to the cylindrical walls of the vessel was removed to the centre of the vessel and rotation was resumed for a further 2 minutes and then stopped again. A further charge of 45 ppw of the fine plaster particles was added to the vessel. The purpose of this additional charge was to absorb any excess n-propanol. The cycle of a three minute rotation and removal of material was repeated for a further four times to ensure uniform mixing and agglomeration. The product obtained at this stage contained n-propanol and so would not flow or wet with water properly and it was found that the n-propanol inhibited uniform hydration (and hence hardening) of the plaster. So the next step was to remove n-propanol.

The contents of the vessel were warmed by introducing water at 50° C. into the water jacket and the vessel was evacuated in order to remove n-propanol in what was in effect a drying process. The drying process was continued for 40 minutes during which time the pressure within the vessel was reduced to 30 m.bar. After drying, it was found that the vessel contained free-flowing agglomerates of interlinked fine particles of plaster of Paris having a residual n-propanol content of 0.164 wt %.

The agglomerates were passed through a 300 µm sieve to separate the large agglomerates from "fines". Over 50 wt % of the agglomerates had a maximum particle diameter of from 300 µm to 1 mm inclusive. These agglomerates were robust enough to accommodate filling into, transport in and pouring from packets of the type used to supply plaster of Paris to DIY users.

c) Conversion to Aqueous Compositions 50 ppw of the large agglomerates were poured into 28 ppw of water at ambient temperature and gently stirred by hand for two minutes using a laboratory spatula which was 7 mm wide at its widest point. Stirring disrupted the interlinks within the agglomerates and reversed the agglomeration process by releasing fine particles of plaster which acquired thoroughly wet surfaces. A hydraulic filler paste was produced which was free of irregularly sized pellets of largely unwetted particles and so it could be applied by hand-trowel to an impervious substrate with no realistic risk of blemishes appearing in the surface of the hardened plaster.

The composition contained no retarder and so it hardened in about 10 to 15 minutes.

For ease of comparison, the above results are summarised in the Table, shown later in this specification.

EXAMPLES 2 AND 3

Usefulness in DIY Formulations and the Toleration of Wet Organic Polar Liquid

Probably all plaster of Paris filler compositions sold in the DIY market contain auxiliary additives to adapt them to the needs of unskilled users. It is also economically desirable to use industrial grade organic polar liquids which often contain some water. For these reasons, it was decided to test the method of Example 1 using DIY formulations and less dry n-propanol.

Accordingly, the method of Example 1 was repeated as Example 2 except that less dry n-propanol containing 0.2 wt % water was used and the fine casting plaster was exchanged for a plaster composition manufactured as "Moltofill Innen" by Alabastine NV of Ammerzoden in the Netherlands. The amounts of plaster and n-propanol were adjusted to be 87 wt % and 12.44 wt % respectively and 0.06 wt % of a proprietary cellulosic external binder known as "Methocel 311" was added to the fine particle plaster. In Example 3, the method of Example 1 was repeated but the n-propanol was again less dry (0.2 wt % water) and the amounts of plaster and n-propanol were 82.06 wt % and 15.4 wt % respectively. In addition, 2.54 wt % of the formulation was provided by a proprietary mixture of a retarder system, an adhesion promoter, an accelerator and clay and cellulosic thickeners. Finally, the presence of the auxiliary additives was found to reduce the amount of extra plaster mixture needed to absorb excess polar liquid so the 45 ppw of additional plaster used in Example 1 was reduced to 5 to 20 ppw for the plaster/additive mixtures used in Examples 2 and 3. The precise weight added had to be judged by eye during addition owing to variability in the nature of the additives.

Both formulations behaved essentially like that of Example 1 except that in Example 2 the disruption of the interlinks took a little longer requiring stirring for 2 to 3 minutes with their hardening time being retarded to between 75 and 80 minutes. In Example 3 the hardening time was retarded to between 60 and 90 minutes. A photomicrograph of the agglomerates of Example 3 indicated that the interlinks involved mechanical keying.

COMPARATIVE EXAMPLES A AND B

Importance of the Organic Polar Liquids

The method of Example 2 was repeated but with the n-propanol being omitted in Comparative Example A and with it being replaced by n-heptane in Comparative Example B. N-heptane is of course non-polar. Both these comparative Examples failed to produce agglomerates and so the plaster remained as fine particles. Accordingly it suffered the usual problems of dust, poor flow from a packet and clumping into pellets on addition to water.

EXAMPLE 4

Acceleration of the Disruption of Interlinks

The method of Example 3 was repeated except that the amounts of plaster composition and n-propanol were adjusted to 82.3 wt % and 16.0 wt % respectively and 0.6 wt 6 % sodium carbonate and 1.1 wt % citric acid were added to the plaster composition to serve as an effervescer. The carbonate and acid also have a retarding effect on the rate of hardening of the plaster.

The effervescer combination was found to facilitate disruption of the interlinks in that only 1.5 minutes of stirring was needed but the hardening time was retarded to 120 to 150 minutes.

EXAMPLES 5 TO 8

Other Alcohols

The method of Example 1 was repeated except that the following modifications were made:

a) Example 5: The n-propanol was replaced by analytical grade ethanol containing 0.03 wt % water.
b) Example 6: The n-propanol was replaced by analytical grade methanol containing less than 0.2 wt % water.
c) Example 7: The n-propanol was replaced by an analytical grade n-butanol containing less than 0.1 wt % water.
d) Example 8: The n-propanol was replaced by iso-propanol containing less than 0.2 wt % water and the amounts of plaster and iso-propanol were adjusted to 84 wt % and 16 wt % respectively.

The use of ethanol produced very robust agglomerates which could however still be disrupted on stirring into water although a stirring time of 3 to 4 minutes was needed.

The use of methanol produced agglomerates even more robust than those obtained using ethanol and requiring a greater amount of sheer to disrupt them.

The use of n-butanol and iso-propanol produced less robust agglomerates but which required only about one minute of stirring to disrupt.

EXAMPLES 9 TO 12

Other Polar Liquids

A simple hand mixing scouting procedure was devised to estimate the utility of four other polar liquids. The procedure comprised hand mixing fine particles of plaster compositions with a polar liquid using a laboratory spatula. The ingredients were mixed together until they formed an approximately spherical mass which was then smeared against a flat surface using a palette knife so as to generate agglomerates of fine particles held together by polar liquid. The agglomerates were then heated in an oven at 40° C. to dry off polar liquid.

The scouting procedure was performed on the following, formulations:

a) Example 9:

| | |
|---|---|
| Fine particles and additives as used in Example 2 | 81 wt % |
| Propylene Carbonate | 19 wt % |

Drying required 2 hours, but otherwise conveniently free flowing agglomerates were formed which disrupted on stirring in water to produce useful hydraulic filler pastes.

b) Example 10:

| | |
|---|---|
| Fine particles and additive as used in Example 3 | 77 wt % |
| Pentyl Acetate | 23 wt % |

Drying required 3 hours, but otherwise the performance was as in Example 9.

c) Example 11:

| | |
|---|---|
| Fine particles and additives as in Example 2 | 80 wt % |
| Dimethoxymethane | 20 wt % |

Drying required 4 hours, but otherwise the performance was as in Example 9.

d) Example 12:

| | |
|---|---|
| Fine particles and additive as in Example 3 | 86 wt % |
| Propan-1,2 diol | 14 wt % |

Drying required 20 hours, but otherwise the performance was as in Example 9.

TABLE

SUMMARY OF RESULTS

| Example | Polar Liquid | Agglomerate Type | *Stirring time: mins | Drying time: hours |
|---|---|---|---|---|
| A | None | None | — | — |
| B | n-hexane | None | — | 0.7 |
| 1 | quasi-dry n-propanol | Robust | 2 | 0.7 |
| 2 | wet n-propanol | Robust | 2 | 0.7 |
| 3 | wet n-propanol | Robust | 2 | 0.7 |
| 4 | wet n-propanol | Robust | **1.5 | 0.7 |
| 5 | Ethanol | Robust | 3 | 0.7 |
| 6 | Methanol | Very Robust | 4 | 0.7 |
| 7 | n-butanol | Weak | 1 | 0.7 |
| 8 | isopropanol | Weak | 1 | 0.7 |
| 9 | Propylene carbonate | Robust | — | 2 |
| 10 | Pentyl Acetate | Robust | — | 3 |
| 11 | Dimethoxy-methane | Robust | — | 4 |
| 12 | Propane-1,2 diol | Robust | — | 20 |

*Stirring time needed to disrupt interlinks
**Effervescent used

What is claimed is:
1. A method for the agglomeration of particles of plaster of Paris which method includes a) providing a vessel having means for agitating the particles of plaster of Paris, b) introducing into the vessel both the particles of plaster of Paris and an organic polar liquid, c) subjecting the particles and the liquid to agitation and d) subsequently to a period of agitation, subjecting the particles and liquid to drying to remove at least a major proportion of the organic polar liquid.

2. A method for the agglomeration of particles of plaster of Paris having a weight average particle dimension of below 100 μm, which method includes a) providing a vessel having means for agitating the particles of plaster of Paris, b) introducing into the vessel both the particles of plaster of Paris and an organic polar liquid, c) subjecting the particles and the liquid to agitation and d) subsequently to a period of agitation, subjecting the plaster of Paris and organic polar liquid to drying to remove at least a major proportion of the organic polar liquid whereby pluralities of particles are found to have linked together to form linkages which create agglomerates of the particles having a weight average dimension in excess of 100 μm and in which the linkages are disrupted when the agglomerates are dispersed by hand into water.

3. A method according to claim 1 or claim 2 wherein the organic polar liquid has an ability to form hydrogen bonds.

4. A method according to claim 3 wherein the organic polar liquid is a hydroxy compound.

5. A method according to claim 4 wherein the hydroxy compound is a straight chain aliphatic alcohol containing up to 4 carbon atoms.

6. A method according to claim 5 wherein the alcohol is n-propanol.

7. A method according to claim 1 or claim 2 wherein the organic polar liquid contains up to 0.3 wt % of water.

8. A method according to claim 1 or claim 2 wherein the particles and liquid are dried until the amount of residual organic polar liquid is below 0.5 wt % based on the weight of the particles and liquid.

9. A method according to claim 1 wherein the particles have a weight average particle dimension of less than 100 μm and the agitation conditions are chosen so as to produce agglomerates having a weight average particle dimension in excess of 100 μm.

10. A method according to claim 1 or claim 2 wherein agglomerates of plaster of Paris are added to the particles and wherein the added agglomerates are obtained by sieving agglomerates previously made by said method.

11. A method for making an aqueous composition containing plaster of Paris and water wherein an agglomerate made by a method according to claim 1 is stirred into water by hand using a stirrer.

12. An agglomerate of a plurality of interlinked particles of plaster of Paris wherein a) the particles have a weight average particle dimension of below 300 μm, b) the agglomerate has a maximum dimension of above the weight average particle dimension of the particles and c) interlinks within the agglomerate can be disrupted by hand stirring the agglomerate together with like agglomerates into water.

13. An agglomerate according to claim 12 wherein the particles are interlinked by mechanical keying.

14. An agglomerate according to claim 12 or claim 13 wherein the agglomerate carries up to 0.5 wt % of an organic polar liquid based on the weight of the agglomerate.

15. An agglomerate according to claim 12 wherein the organic polar liquid has an ability to form hydrogen bonds.

16. An agglomerate according to claim 15 wherein the organic polar liquid is a hydroxy compound.

17. An agglomerate according to claim 16 wherein the hydroxy compound is a straight chain aliphatic alcohol containing up to 4 carbon atoms.

18. An agglomerate according to claim 17 wherein the alcohol is n-propanol.

19. An agglomerate according to claim 12 wherein the agglomerate has a maximum dimension above 300 μm.

20. A dry precursor mixture comprising an agglomerate as claimed in claim 12 and at least one of the following auxiliary additives:

a) a thickener/binder, b) a retarder, c) a humectant, d) an effervescer, e) an adhesion promoter, f) an extender, and g) a buffer component.

21. A method for making an aqueous composition containing plaster of Paris and water wherein an agglomerate according to claim 12 is stirred into water by hand using a stirrer.

22. A dry precursor mixture comprising agglomerates of plaster of Paris and at least one of the following auxiliary additives:

a) a thickener/binder, b) a retarder, c) a humectant, d) an effervescer, e) an adhesion promoter, f) an extender, and g) a buffer component, said agglomerates being made by a method comprising agitating a mixture of particles of plaster of Paris and an organic polar liquid and subsequent to agitation of said mixture, drying the agitated mixture of particles and organic liquid to remove at least a portion of said organic liquid.

23. A method for making an aqueous composition containing plaster of Paris and water wherein a dry precursor mixture according to claim 22 is stirred into water by hand using a stirrer.

* * * * *